United States Patent [19]

Brumleve

[11] Patent Number: 5,873,210
[45] Date of Patent: Feb. 23, 1999

[54] RECEIVER, TARP BOW AND FRAME

[76] Inventor: Donald J. Brumleve, P.O. Box 274, Teutopolis, Ill. 62467

[21] Appl. No.: 820,482

[22] Filed: Mar. 18, 1997

[51] Int. Cl.$^6$ ..................................................... B60P 7/02
[52] U.S. Cl. ................... 52/735.1; 52/653.2; 135/88.09; 296/100.17; 296/100.18; 296/104; 296/122; 403/359; 403/383
[58] Field of Search ......................... 52/653.2, 23, 731.6, 52/735.1, 739.1; 135/88.09, 88.13, 88.05, 151; 296/100, 104, 105, 43, 118, 121, 122, 100.17, 100.18; 160/65, 72, 73, 77, 81; 403/383, 359

[56] References Cited

U.S. PATENT DOCUMENTS

| 257,900 | 5/1882 | Squire ................................. 52/736.1 X |
| 1,098,252 | 5/1914 | Griswold ................................ 52/736.1 |
| 1,263,759 | 4/1918 | Hanaway ............................. 296/105 X |
| 1,654,132 | 12/1927 | Lewis et al. .............................. 296/119 |
| 2,066,227 | 12/1936 | Reukauf, Jr. et al. ..................... 160/81 |
| 2,194,901 | 3/1940 | Heuer ..................................... 296/118 |
| 2,565,746 | 8/1951 | Turner ..................................... 296/104 |
| 2,665,103 | 1/1954 | Flora et al. .......................... 296/104 X |
| 2,679,432 | 5/1954 | Ruth .......................................... 296/40 |
| 2,969,284 | 1/1961 | Ambli ..................................... 296/100 |
| 3,066,974 | 12/1962 | Ambli . |
| 3,226,153 | 12/1965 | Haid . |
| 3,367,347 | 2/1968 | Smith . |
| 3,599,740 | 8/1971 | Martinmaas . |
| 3,837,702 | 9/1974 | Case . |
| 3,894,766 | 7/1975 | Woodward ............................... 296/104 |
| 4,248,475 | 2/1981 | Johnsen ............................... 296/104 X |
| 4,263,925 | 4/1981 | Arganbright . |
| 4,823,707 | 4/1989 | Salsbury et al. ..................... 296/104 X |
| 4,902,065 | 2/1990 | Thralls ..................................... 296/104 |
| 5,054,841 | 10/1991 | Zalman . |
| 5,080,423 | 1/1992 | Merlot et al. ........................... 296/105 |
| 5,186,513 | 2/1993 | Strother . |
| 5,288,123 | 2/1994 | Dimmer ............................. 296/104 X |
| 5,299,849 | 4/1994 | Cook et al. . |
| 5,472,256 | 12/1995 | Tucker . |
| 5,487,584 | 1/1996 | Jespersen . |
| 5,664,824 | 9/1997 | Stephens et al. .................... 296/104 X |
| 5,681,074 | 10/1997 | Christensen ............................ 296/181 |

FOREIGN PATENT DOCUMENTS 217574  10/1908  Germany .

Primary Examiner—Carl D. Friedman
Assistant Examiner—Laura A. Callo
Attorney, Agent, or Firm—Grace J. Fishel

[57] ABSTRACT

A receiver for a tarp bow, a tarp bow and a frame for supporting a removable covering. The receiver is adapted to be attached to a side wall of a container with an open top, said receiver further adapted to be pivoted in a vertical plane with respect to the side wall. The receiver has an open end that is circular in cross section with a coalesced side channel for receipt of a leg of a tarp bow. The tarp bow is preferably formed of aluminum tubing having a cross section complementary to the receiver. A plurality of bows spanning the width of the top opening and mounted in the receivers forms a frame that can be pivoted out of the top opening at either end of the bow.

11 Claims, 3 Drawing Sheets

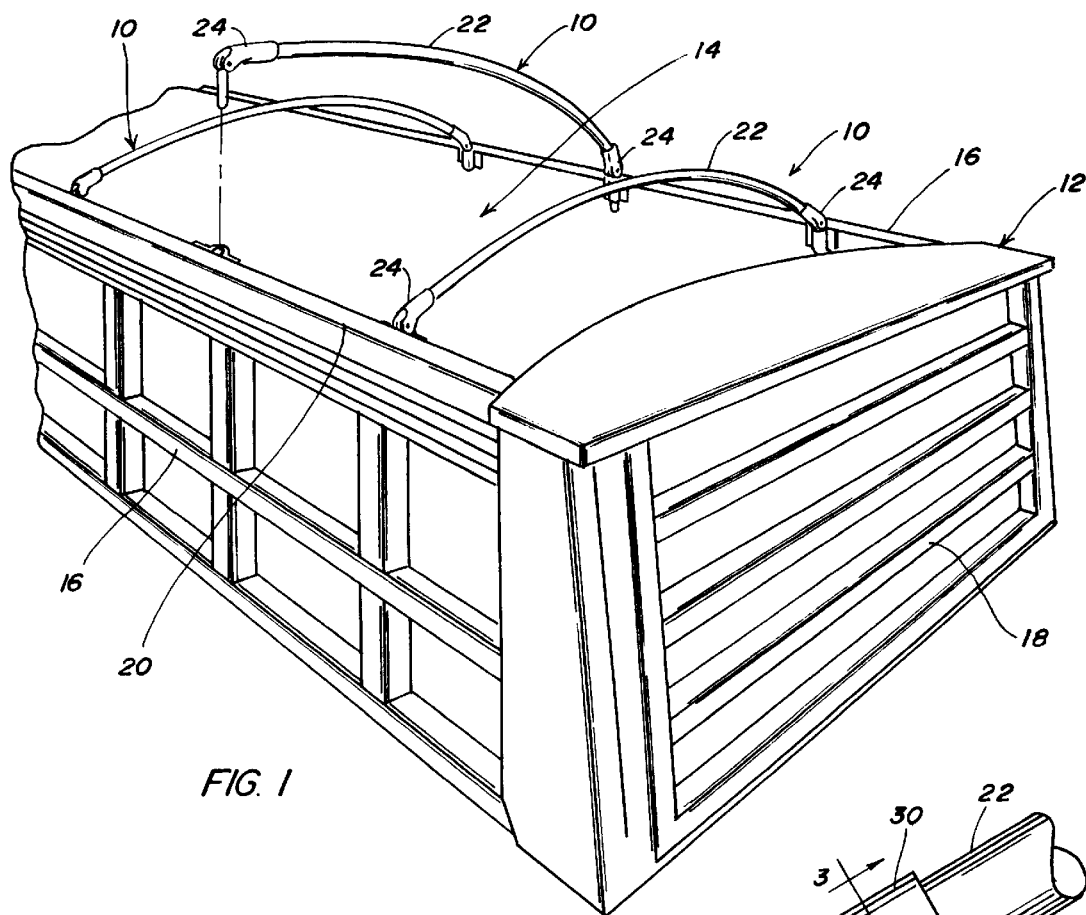
FIG. 1
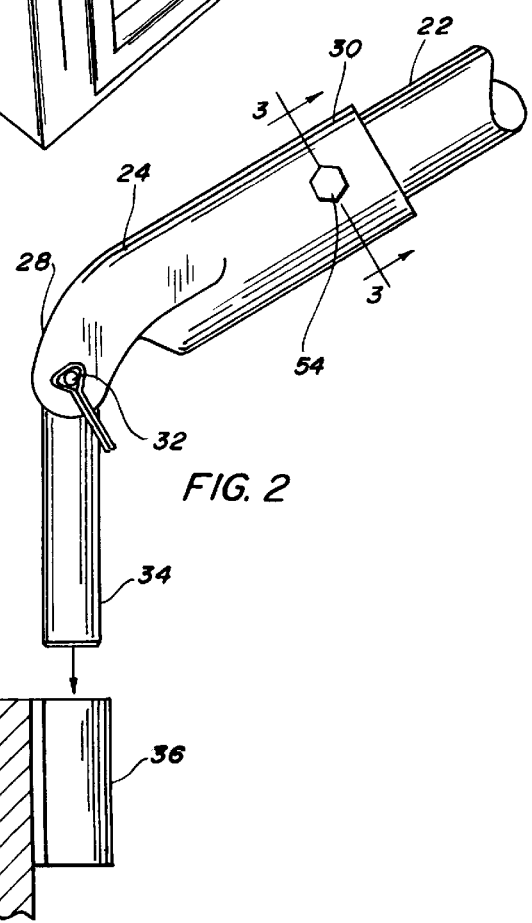
FIG. 2
FIG. 3

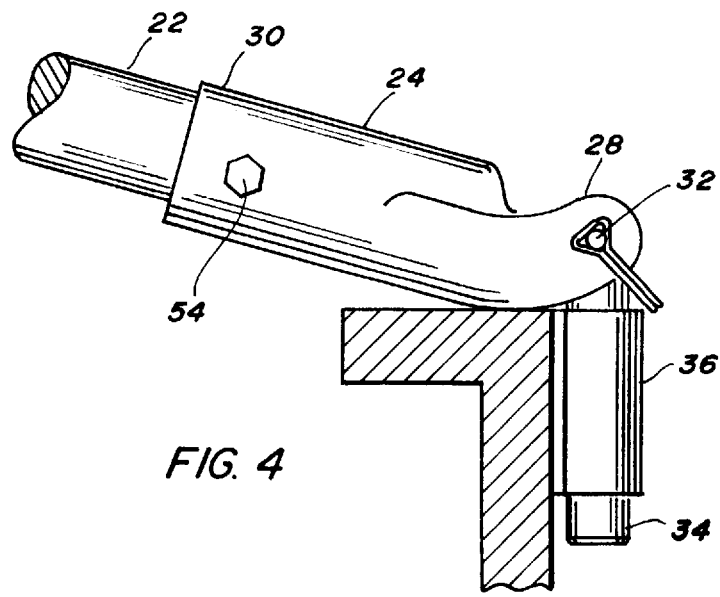
FIG. 4
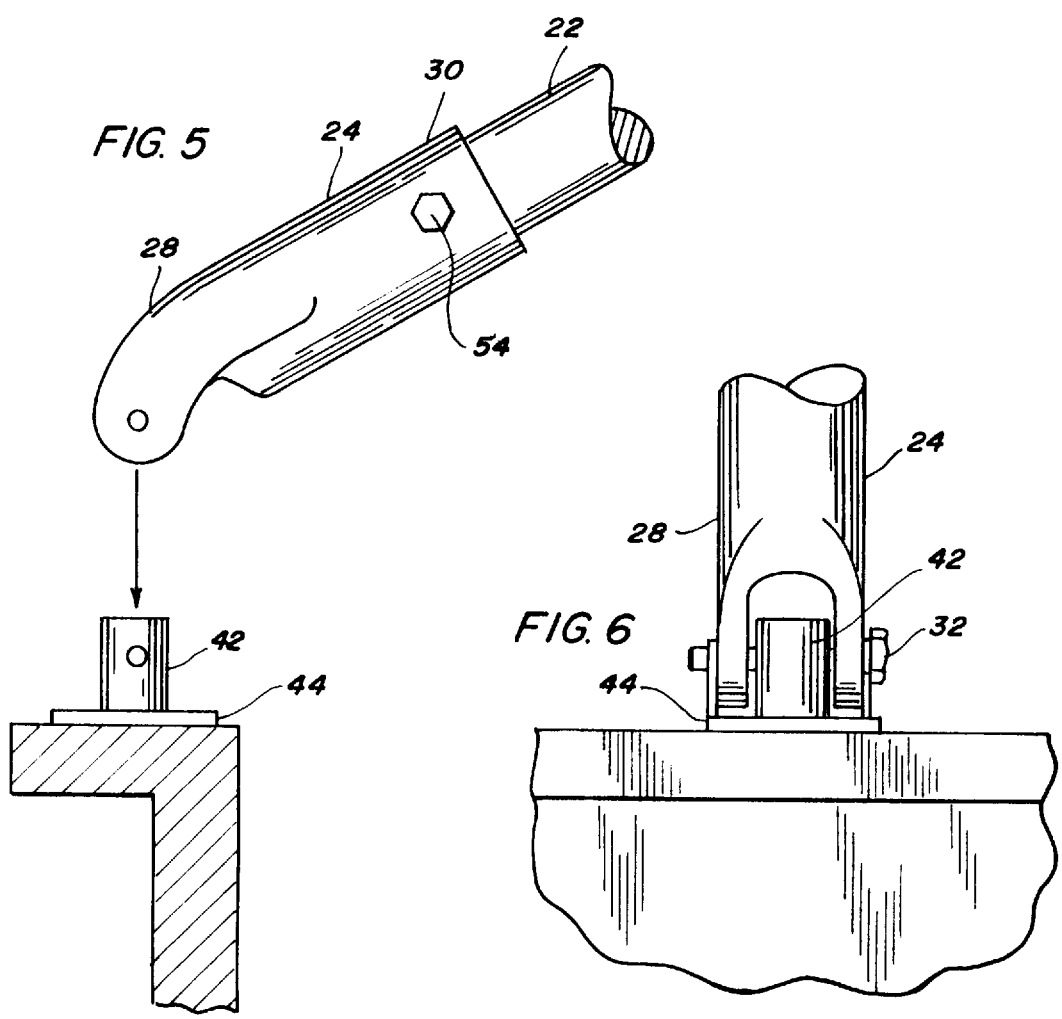
FIG. 5
FIG. 6

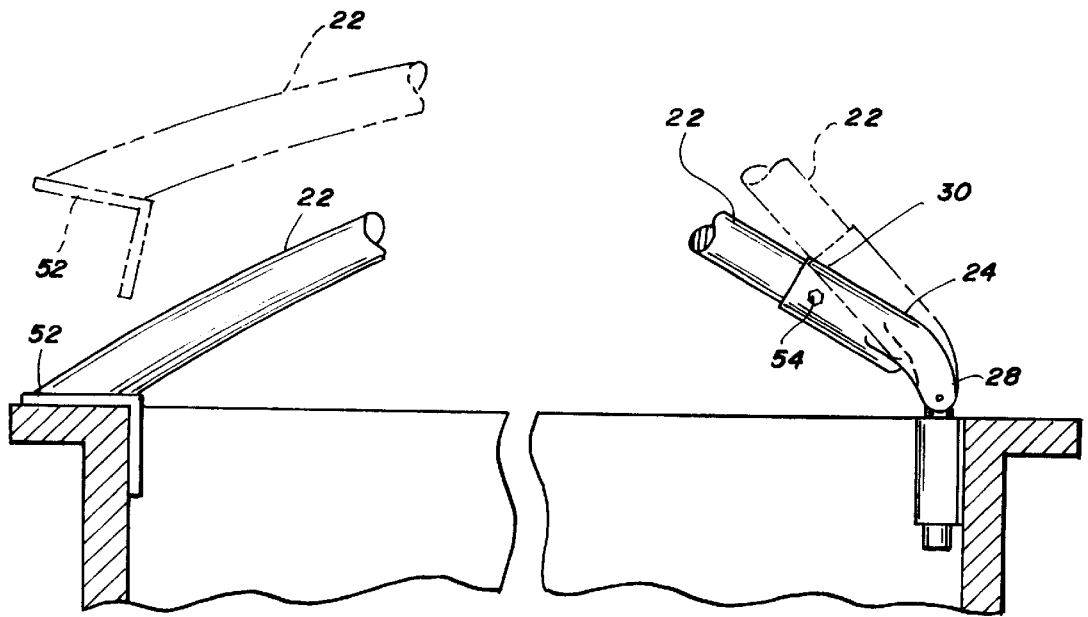
FIG. 7
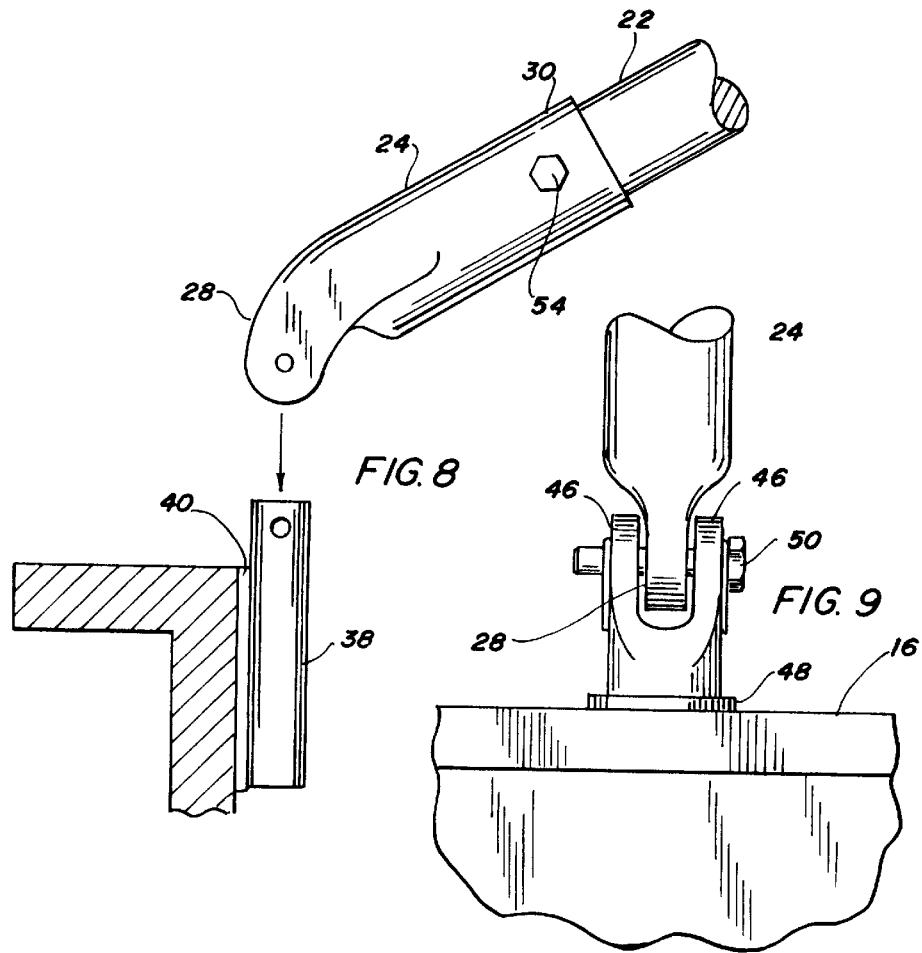
FIG. 8
FIG. 9

RECEIVER, TARP BOW AND FRAME

BACKGROUND OF THE INVENTION

1. Field of the Invention

The present invention relates to an aluminum receiver, preferably for use with an aluminum tarp bow to form a strong tarp frame that can be swung up, totally out of the way, from the left or right, by a driver.

2. Brief Description of the Prior Art

The top opening of trucks, trailers and other containers are often covered with a tarp or other covering which forms a protective canopy, covering the load. A plurality of bows spanning the width of the top opening forms a frame for supporting the tarp.

When the bows are fixed to the side walls of the container, the frame hinders access to the inside of the container and the bows may be damaged by items passing through the opening, such as equipment or rocks, if contact is made. Aluminum or steel bows have to be straightened or replaced when they are bent. Plastic bows bend when they are hit but the frame is still in the way for loading large items and the bows are not as strong. Even regular exposure to small items, such as grain particles, will cause abrasion of the bows with extended contact over time. The bows in a fixed frame can be removed but this requires the driver to climb up on the trailer to remove the bows, which must be stored somewhere while the container is being loaded, and then reinstalled. When the bows are made of steel, they are heavy for the driver to handle and injuries do occur.

There are tarp bow systems wherein the bows swivel up and mostly out of the top opening. For example, U.S. Pat. No. 5,487,584 assigned to Wahpeton Canvas Co. South Dakota, Inc., describes a rope operated system wherein the bows are pivoted to a ridgepole and swung about angled receivers seven-eights of the way from the opening. The angled receivers and the bows sold by Wahpeton Canvas are made of steel as bows made of aluminum tubing that is circular in cross section would not be strong enough to be pivoted in the frame. Another ground controlled system, formed of steel, is sold by A.T.B. Inc. wherein one end of the bows is attached to a rod, which when rotated, lifts the other end of the bows up and mostly out of the top opening. Both the Wahpeton and the A.T.B. system are permanently mounted such that the frame is swung away only on the driver's side, requiring that the container be loaded from the left side. This is a serious limitation as loading from the left is not always convenient, or even feasible.

There is a need for a tarp bow and a complementary receiver that can be used to form a tarp frame which can be easily swung up, totally out of the way, from the left or right, by the driver. The bows should be light weight but strong so that they can be easily handled, remained attached to a side wall on one side of the container, out of the way during loading, but readily available for reinstallation. It is to this need that the present invention is addressed.

SUMMARY OF THE INVENTION

In view of the above, it is an object of the present invention to provide a receiver and tarp bow which can be used to make a frame that can be pivoted out of the open top of a container so that the container can be loaded from the right or left. It is another object to provide to provide a light weight, but strong tarp bow and frame that can be easily pivoted out of the way by a driver. Other objects and features of the invention will be in part apparent and in part pointed out hereinafter.

In accordance with the invention, a receiver for supporting one end of a tarp bow along the top edge of a side wall of a container having a top opening comprises an elongated member forming a receptacle with first and second ends. The first end of the receptacle is adapted to be pivoted to the side wall about a vertical plane such that the receiver is pivoted out of the top opening. The second end of the receptacle is open and circular in cross section with a coalesced side channel, with the second end adapted to receive and hold one end of the tarp bow. The tarp bow preferably is adapted to span the width of the top opening of the container and is formed of aluminum metal tubing which is circular in cross section with a coalesced side channel for hand-in-glove fit in the second end of the receptacle. A plurality of said bows form a frame for supporting a covering. The bows are preferably mounted in receivers, pairs of which are provided on opposing side walls. When the bows have a cross section complementary to the receivers, the frame may be formed from aluminum and is light enough for a driver to rotate the bows out of the top opening, leaving the bows pivoted to the side wall, either on the left or right, so that the container can be loaded from either side.

The invention summarized above comprises the constructions hereinafter described, the scope of the invention being indicated by the subjoined claims.

BRIEF DESCRIPTION OF THE DRAWINGS

In the accompanying drawings, in which several of various possible embodiments of the invention are illustrated, corresponding reference characters refer to corresponding parts throughout the several views of the drawings in which:

FIG. 1 is a perspective view of a tarp frame in accordance with the present invention shown mounted on a container having an open top;

FIG. 2 is a side elevational view of a receiver in accordance with the present invention shown pivoted to a stud exploded from a bracket attached to a side wall of the container, a leg of a bow, partially broken away, is received in the receiver;

FIG. 3 is a section taken along line 3—3 in FIG. 2;

FIG. 4 is a view similar to FIG. 2 showing the receiver pivoted out of the open top;

FIG. 5 is side elevational view of the receiver shown pivoted to a second stud mounted on a bracket attached to a rail along the top edge of the side wall;

FIG. 6 is front view of the receiver shown in FIG. 5;

FIG. 7 is a side elevational view, with parts broken away, showing a bow spanning the width of the container, with one end of the bow being supported on a L-shaped bracket;

FIG. 8 is a side elevational view of the receiver shown pivoted to a third stud mounted on a bracket attached to the side wall; and, FIG. 9 is a side elevational of a second receiver in accordance with the present invention.

DETAILED DESCRIPTION OF THE INVENTION

Referring to the drawings more particularly by reference number, reference numeral 10 refers to a frame in accordance with the present invention for use in connection with a truck, trailer or other container 12 with a top opening 14 and having side walls 16 and end walls 18 (only the rear of which is shown in FIG. 1). A rail 20 is provided along the upper edge of side walls 16. For purposes of this invention, the truck box, trailer or other container are conventional items known in the art. Frame 10 and the combination of the frame with the container, however, is new.

Frame 10 is composed of a plurality of bows 22 and receivers 24, each of which is similar so that a description of one will suffice to explain the others. Each of bows 22 comprises an elongated member which is bent into an arc or a peak, opposite ends of which are adapted to be received into one of receivers 24, more particularly described hereinafter. Bows 22 are preferably formed of aluminum tubing to reduce the weight and have a cross section complementary to receivers 24, i.e., circular with a coalesced side channel 26.

Receiver 24 is an elongated receptacle with first and second ends 28, 30, respectively. First end 28 is adapted to be pivoted to one of side walls 16 about a vertical plane such that the receiver is pivoted out of top opening 14 as shown in FIG. 4. The way in which first end 28 is pivoted can be accomplished in a variety of ways, a representative four of which are shown in the drawings. As shown in FIGS. 2 and 4≧8, first end 28 is forked for receipt of a pin 32 passing through diametric bores about which the first end is adapted to be pivoted. The forked first end 28 is pivoted to an upper end of a stud 34. Stud 34 is hinged in a bracket 36 which is welded, bolted or otherwise attached to the inside of side walls 16 such that first end 28 of receiver is elevated slightly above rail 20. Bracket 36 is preferably made of steel when the side walls are steel and of aluminum, when the side walls are aluminum to avoid corrosion.

In the embodiment shown in FIG. 8, a stud 38 is welded or otherwise attached to a bracket 40. Other than for not being hinged, however, stud 38 functions in the same manner as described above in connection with FIGS. 2 and 4≧8. In a third embodiment, as shown in FIGS. 5–6, a stud 42 is welded or other attached to a bracket 44, which is welded, bolted or otherwise attached to rail 20. In the fourth embodiment, as shown in FIG. 9, some of the elements are reversed and first end 28' of receiver 24' is not forked. Diametrically opposite sides of first end 28' are flattened for receipt between a pair of ears 46 attached to a bracket 48 on side walls 16. A pin 50 passes through diametric bores in ears 46 and through first end, passing through the flattened sides, about which the first end is adapted to be pivoted.

Second end 30 of receiver 24 is open and circular in cross section with a coalesced side channel 26. Open end of receiver is adapted to receive and hold one end of bow 22. While channel 26 can be triangular, etc. in cross section, it is preferred that channel 26 be circular. As shown in FIG. 3, receiver 24 is elongate in transverse cross-section with a first generally circular lobe and a second, smaller generally circular lobe coalesced to the first. The second lobe is on the inside of the bend with reference to bow 22. It is also preferred that bow 22 have a cross section complementary to the cross section of the receiver for hand-in-glove fit. In addition, when bow 22 has a circular cross section with a coalesced side channel, the bow is strengthened so that it can be formed of aluminum tubing.

Second end 30 of receiver 24 is tapped for receipt of a set screw 54 or a pair of set screws to secure bow 22 in the receiver and to allow for some degree of flexibility as to the length of the frame by adjusting how much of the bow is telescoped into the receiver.

In use as shown in FIG. 1, pairs of receivers 24 are mounted on opposing side walls. It will be readily understood, that bows 22 may be pivoted out of top opening 14 from either the left or the right side. When pivoted out, as shown in FIG. 4, bows 22 remain attached to side walls 16, readily available for reinstallation. In the embodiment shown in FIG. 7, one end of bow 22 is provided with an L-shaped bracket 52 adapted to seat on rail 20. In this case, bows 22 can be pivoted from one side only. When receiver 24 and bows 22 are formed of aluminum, frame 10 is from ⅓ to ½ the weight of a steel frame, making it easier for a driver to rotate the bows out of top opening 14. Injuries are less likely to occur, because of the weight difference and because the bows remain attached to one of the side walls so that the driver does not have to remove them from the container, reducing the number of times that he has to climb into the truck box, trailer or the like.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed:

1. A receiver for supporting one and of a bent tarp bow from a side wall of a container having a top opening, said receiver comprising a receptacle having a first and second end, said first end adapted to be pivoted along a top edge of the side wall about a vertical plane such that the receiver is pivoted out of the top opening, said second end being open and elongate in transverse cross-section with a first generally circular lobe and a second, smaller generally circular lobe coalesced to the first, said second lobe adapted to be on the inside of the bend with reference to a tarp bow, said second end being adapted to receive and hold one end of the tarp bow.

2. The receiver of claim 1 wherein the receiver is tapped for receipt of at least one set screw, said set screw adapted to hold an end of the tarp bow in the receptacle.

3. The receiver of claim 2 wherein the receiver is formed of aluminum.

4. The receiver of claim 3 wherein the first end of the receiver is forked for receipt of a pin passing through diametric bores about which the first end is adapted to be pivoted.

5. The receiver of claim 3 wherein the first end of the receiver is adapted to be pivoted between a pair of ears attached to the side wall, said first end further being adapted for receipt of a pin about which the first end is pivoted between the ears.

6. A bent tarp bow adapted to span the width of a top opening in a container having side walls, said bow having first and second ends adapted to a attached to the side walls, said tarp bow formed of aluminum metal tubing that is elongate in transverse cross-section with a first generally circular lobe and a second, smaller generally circular lobe coalesced to the first, said second lobe being on the inside of the bend.

7. A frame for supporting a removable covering over a top opening of a container having side walls, said frame comprising a plurality of bent tarp bows adapted to span the width of the top opening; and, a pair of receivers adapted to be mounted on opposing side walls, each of said receivers comprising a receptacle having a first and second end, said first end adapted to be pivoted to the side walls about a vertical plane such that the receiver is pivoted out of the top opening, said second end being open and elongate in transverse cross-section with a first generally circular lobe and a second, smaller generally circular lobe coalesced to the first, said second end being adapted to receive and hold one end of a tarp bow, said second lobe being on the inside of the bend with reference to the tarp bow whereby the frame is adapted to be formed with bows made from metal tubing with a circular cross-section or from tubing complementary in cross-section to the receiver.

8. The frame of claim 7 wherein the bows and the receivers are formed of aluminum, said bows formed of tubing complementary in cross-section to the receiver.

9. The frame of claim 7 wherein the first end of each receiver is forked for receipt of a pin about which the first end is adapted to be pivoted.

10. The frame of claim 9 wherein a plurality of brackets are attached to the side wall, each of said bracket bearing a stud about which one of the receivers is pivoted.

11. The frame of claim 10 wherein the studs are hinged in the brackets and detachable from the brackets.

\* \* \* \* \*